US006486930B1

(12) United States Patent
Kwon

(10) Patent No.: US 6,486,930 B1
(45) Date of Patent: Nov. 26, 2002

(54) LIQUID CRYSTAL DISPLAY

(76) Inventor: Oh-kyong Kwon, 14-1102 Jangmi Apt., Shinchun-dong, Songpa-gu, Seoul, 138-240 (KR)

(*) Notice: Subject to any disclaimer, the term of this patent is extended or adjusted under 35 U.S.C. 154(b) by 142 days.

(21) Appl. No.: 09/585,760

(22) Filed: Jun. 2, 2000

(30) Foreign Application Priority Data

Jun. 4, 1999 (KR) ........................................ 99-20721

(51) Int. Cl.[7] ........................................ G02F 1/1368
(52) U.S. Cl. ........................................ 349/48; 349/43
(58) Field of Search ........................................ 349/42, 48, 54; 345/92; 257/57, 72

(56) References Cited

U.S. PATENT DOCUMENTS 5,500,538 A * 3/1996 Yamazaki et al. ............ 257/49

* cited by examiner

*Primary Examiner*—William L. Sikes
*Assistant Examiner*—Viet B. Nguyen
(74) *Attorney, Agent, or Firm*—Schweitzer Cornman Gross & Bondell LLP

(57) ABSTRACT

There is provided a liquid crystal display and a circuit for driving the same, having a higher resolution and being able to be manufactured at low cost. The liquid crystal display having first and second plates and a liquid crystal being sealed therebetween includes: a plurality of scanning lines arranged on the first plate one direction; a plurality of data lines arranged on the first plate, intersecting the scanning lines; first and second pixel regions, located at both sides of each data line, respectively; a first switch for selectively transmitting a video signal loaded on a corresponding data line to the first pixel region; and a second switch for selectively transmitting the video signal loaded on the data line to the second pixel region.

22 Claims, 21 Drawing Sheets

LIQUID CRYSTAL DISPLAY

BACKGROUND OF THE INVENTION

1. Field of the Invention

The present invention relates to a liquid crystal display and, more particularly, to a liquid crystal display, in which the driving signal applied to the two scanning lines adjacent to each other is controlled to allow one data line to send two video signals to both pixels, respectively, thereby reducing the number of the data lines by half in comparison with the conventional liquid crystal display.

2. Discussion of Related Art

A liquid crystal display generally consists of upper and lower plates and a liquid crystal being sealed between the two plates. The upper plate has a black matrix, a common electrode and R, G, and B color filter layers for displaying colors formed thereon. On the lower plate, data lines and gate lines are arranged, intersecting each other, to form pixel regions in matrix form. Each of the pixel regions includes one thin film transistor and one pixel electrode.

FIG. 1 is a cross-sectional view of a general liquid crystal display. Referring to FIG. 1, thin film transistors each of which consists of a gate electrode extended from a scanning line (gate line), source and drain electrodes S and D extended from a data line are arranged in matrix form on a lower plate 1, having a predetermined distance. A pixel electrode 2*a* connected to the drain electrode D of each thin film transistor 2 is formed in each pixel region. An upper plate 3 has black matrix layers 4 formed thereon in mesh form, for blocking light transmitted to regions other than the pixel region 2*a*. R, G, and B color filters 5 for displaying colors are formed between the black matrix layers 4. A common electrode 6 is formed on the color filters 5 and black matrix layers 4.

FIG. 2 shows the configuration of the general conventional liquid crystal display. Referring to FIG. 2, the liquid crystal display includes a display panel part 21 consisting of the upper and lower plates and the liquid crystal sealed therebetween to display images, a gate driver part 22 consisting of gate drivers GD each of which applies a driving signal to the panel part 21 in row direction, and a source driver part 23 consisting of source drivers SD each of which supplied a driving signal to the panel part 21 in column direction.

There is explained below a conventional liquid crystal display with reference to the attached drawings. FIG. 3 shows the configuration of the conventional liquid crystal display. Referring to FIG. 3, a plurality of scanning lines G1, G2, . . . , Gn−1, Gn are arranged in row direction, having a predetermined distance, and a plurality of data lines D1, D2, . . . , Dn−1, Dn are arranged, intersecting the scanning lines. A thin film transistor T1 is formed at the portion where each scanning line intersects each data line intersect. A pixel electrode $C_{1c}$ is connected to each thin film transistor T1. Accordingly, a driving voltage is sequentially applied to the scanning lines to turn on the thin film transistors, and signal voltages of corresponding data lines are charged into the pixel electrodes through the turned-on thin film transistors.

FIG. 4 shows the waveform of a driving signal applied to the scanning lines of the conventional liquid crystal display. Referring to FIG. 4, the driving signal is sequentially applied to the scanning lines, starting from the first one G1 to the nth one Gn during one frame, and the signal voltages of corresponding data lines are delivered to the pixel electrodes through the thin film transistors turned on by corresponding scanning lines, to thereby display an image.

In the conventional liquid crystal display, as described above, the driving voltage is sequentially applied to the scanning lines to turn on or off the thin film transistors each of which is connected to each data line, and signal voltages of corresponding data lines are transmitted to corresponding pixel regions through the turned on thin film transistors, to thereby display an image.

However, the aforementioned conventional liquid crystal display has the following problem. In case where the number of pixels increases in order to realize a large-sized liquid crystal display with a higher resolution, the number and the size of its drivers also increase to raise the cost. This brings about a new problem such as connection between the drivers and panel.

SUMMARY OF THE INVENTION

Accordingly, the present invention is directed to a liquid crystal display that substantially obviates one or more of the problems due to limitations and disadvantages of the related art.

An object of the present invention is to provide a liquid crystal display, which is able to display images with the same resolution as that of the conventional liquid crystal display while its data lines are as many as half the number of the data lines of the conventional one, resulting in cost reduction.

To accomplish the object of the present invention, there is provided a liquid crystal display having the first and second plates and a liquid crystal being sealed therebetween, including: a plurality of scanning lines arranged on the first plate in one direction; a plurality of data lines arranged on the first plate, intersecting the scanning lines; the first and second pixel regions, located at both sides of each data line, respectively; a first switch for selectively transmitting a video signal loaded on a corresponding data line to the first pixel region; and a second switch for selectively transmitting the video signal loaded on the data line to the second pixel region.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 is a cross-sectional view of a general liquid crystal display;

FIG. 2 roughly shows the configuration of the general liquid crystal display;

DETAILED DESCRIPTION OF PREFERRED EMBODIMENT

Reference will now be made in detail to the preferred embodiments of the present invention, examples of which are illustrated in the accompanying drawings.

A liquid crystal display according to the present invention is characterized in that a driving signal applied to neighboring two scanning lines is controlled to allow one data line to send a video signal to pixel regions placed at both sides thereof, resulting in reduction in the number of the data lines.

Figure 1:
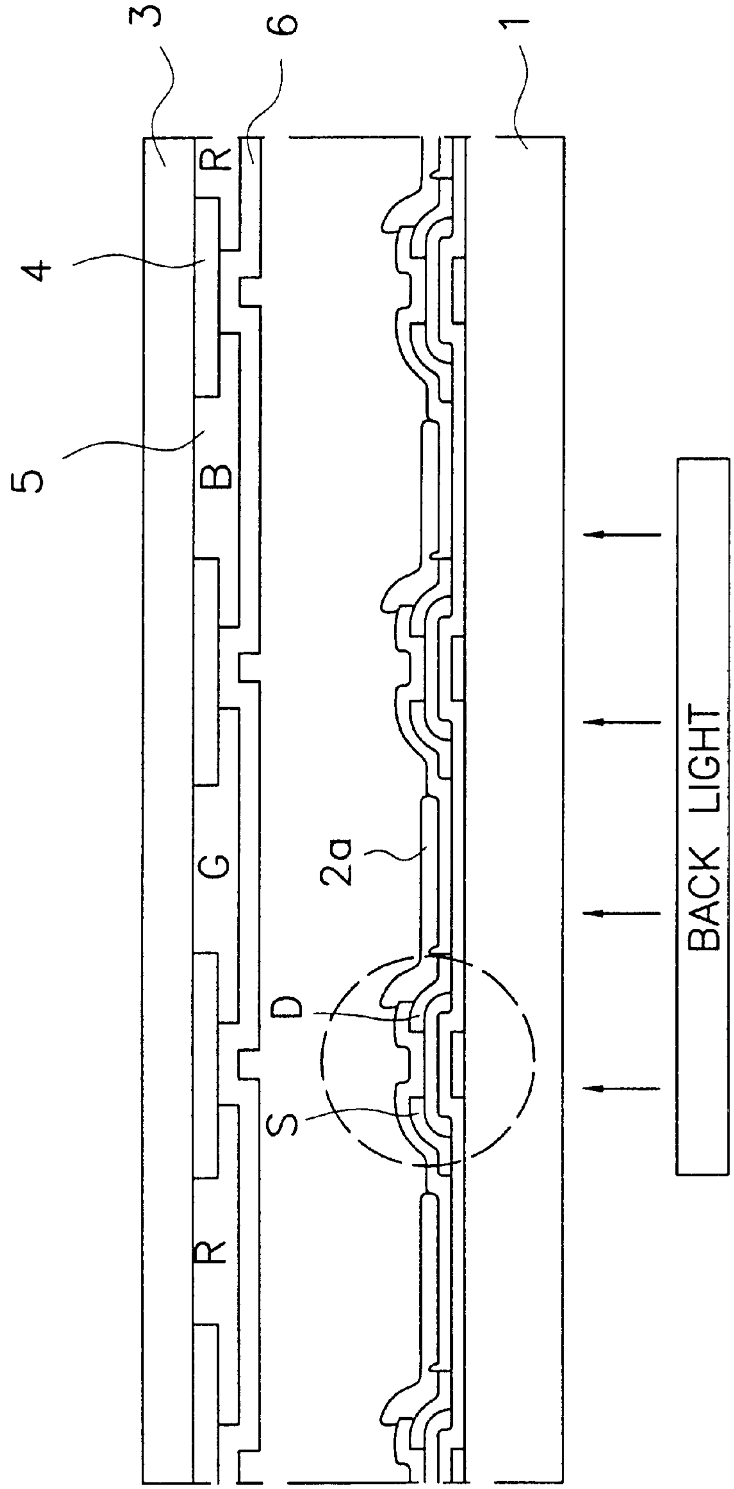
Figure 2:
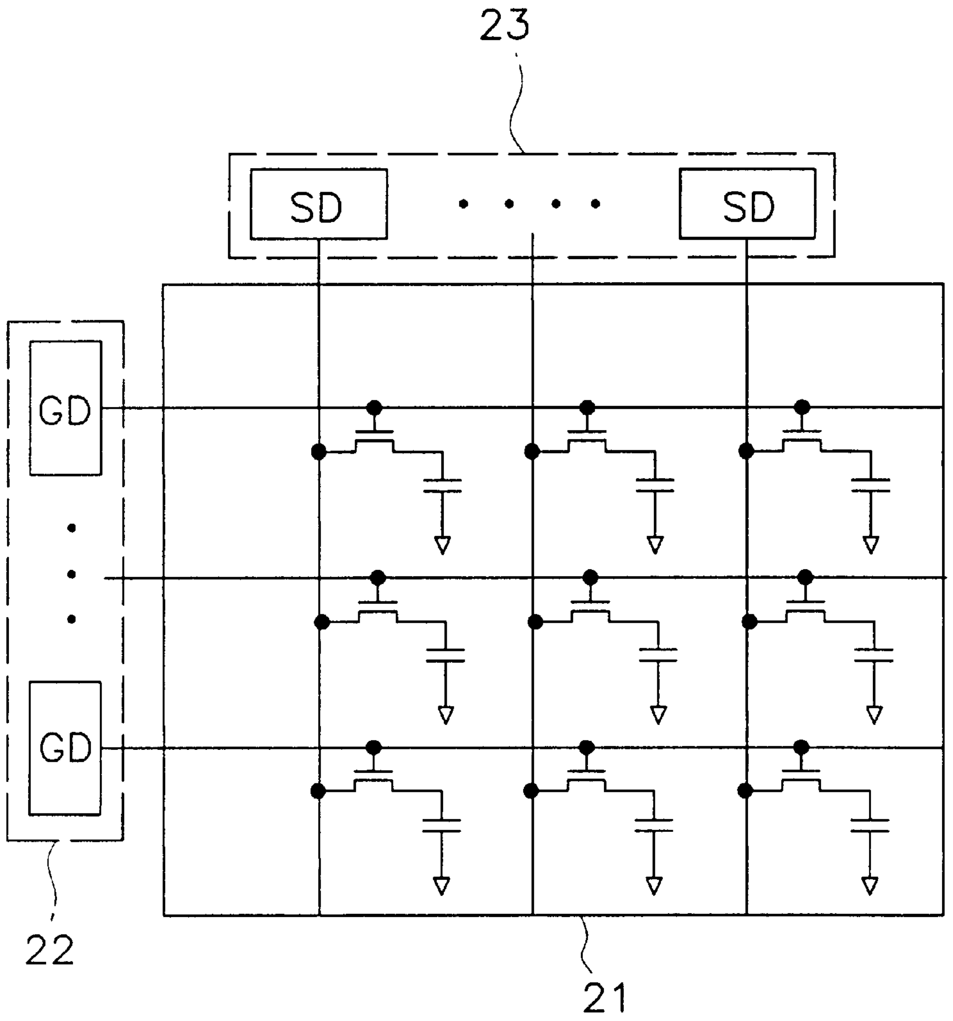
Figure 3:
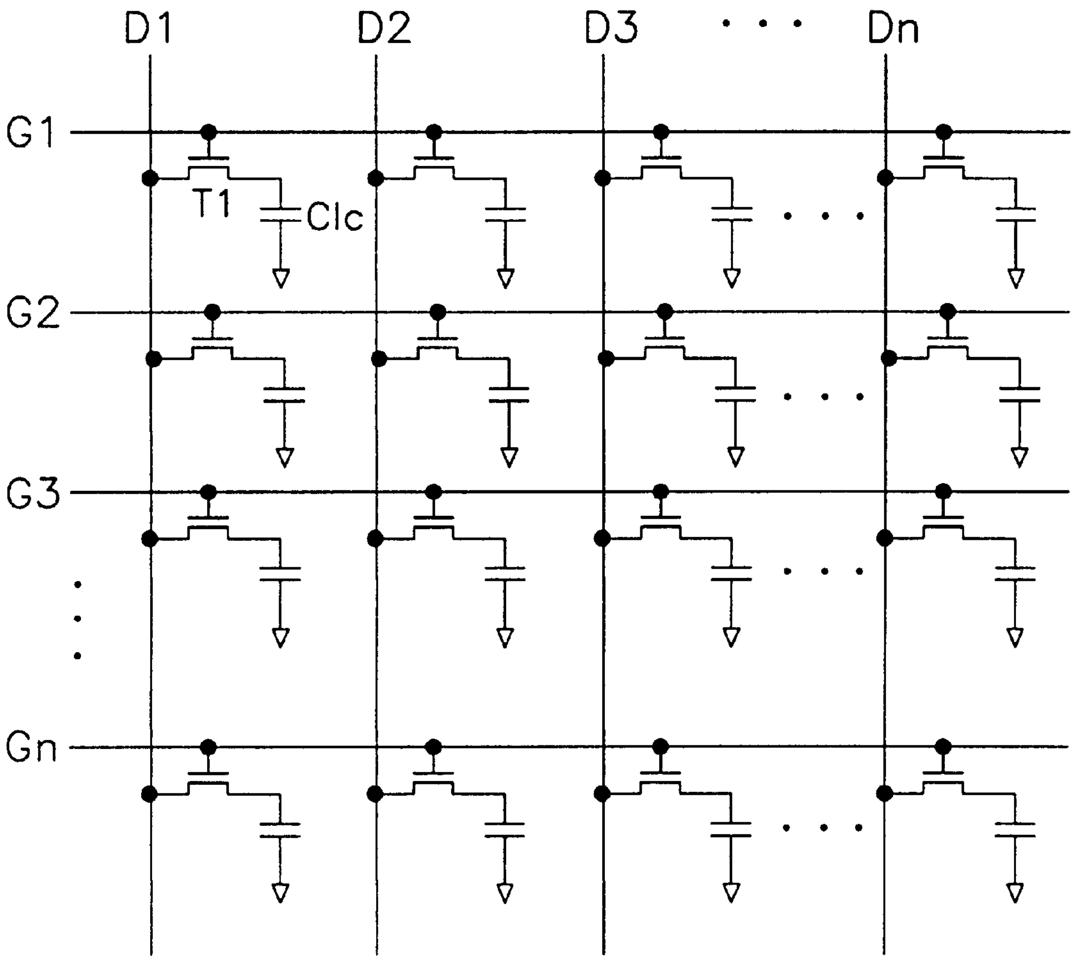
FIG. 3 shows the configuration of a conventional liquid crystal display.
Figure 4:
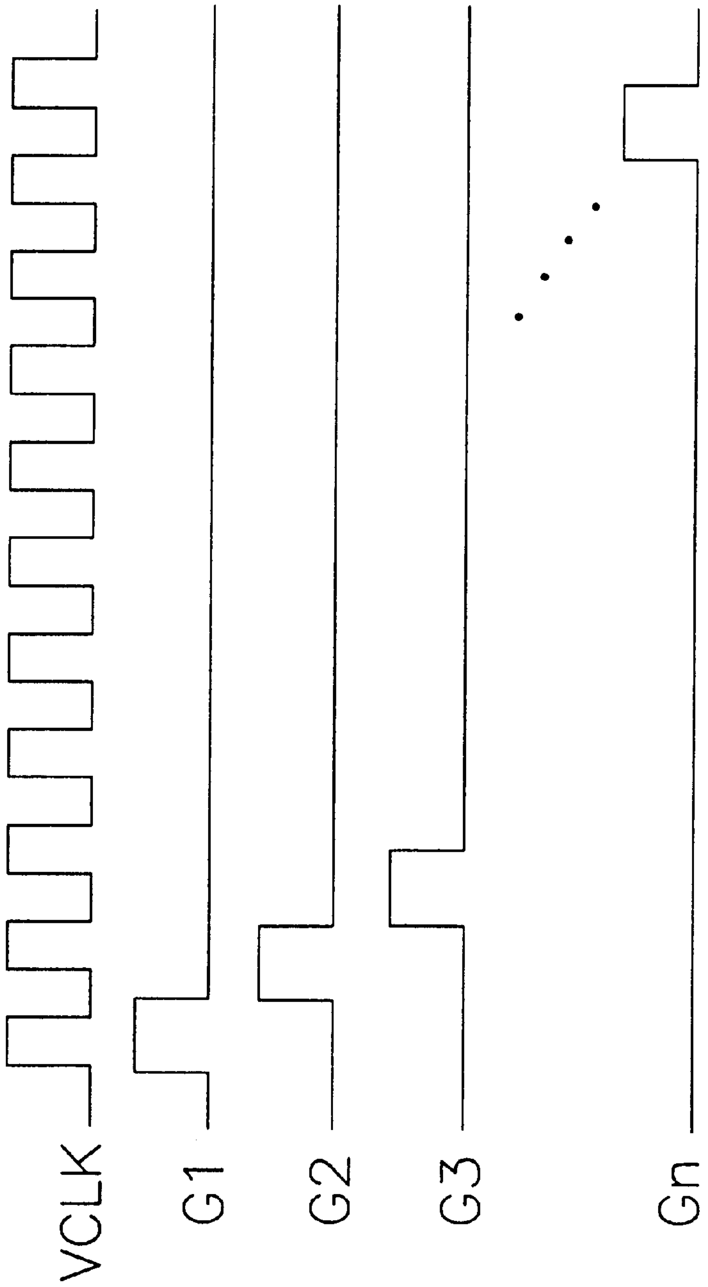
FIG. 4 shows the waveform of a driving signal applied to the scanning lines of the conventional liquid crystal display.
Figure 5A:
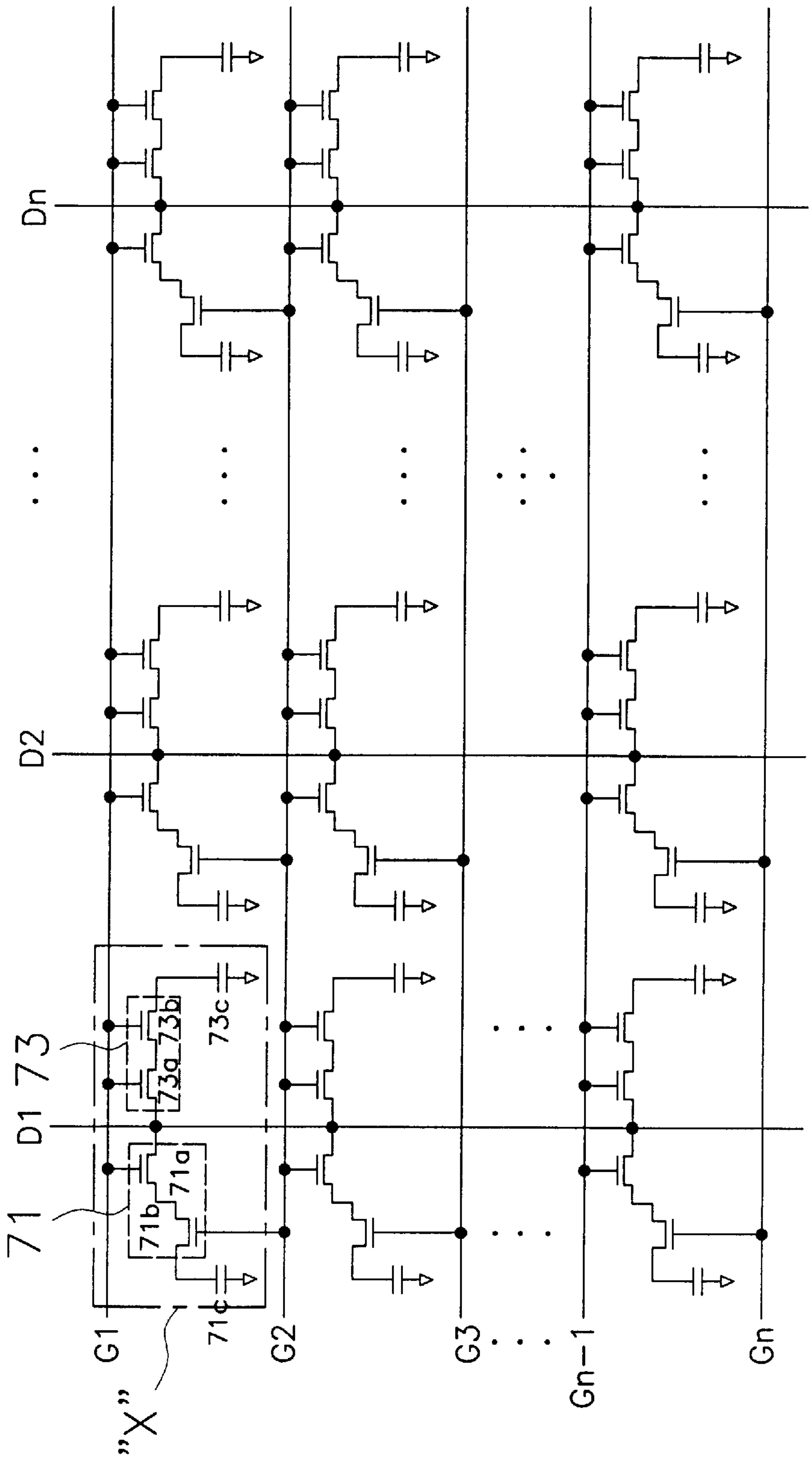
FIG. 5A shows the configuration of a liquid crystal display according to a first embodiment of the present invention.

FIG. 5A shows the configuration of a liquid crystal display according to a first embodiment of the present invention. Referring to FIG. 5A, a plurality of scanning lines G1, G2, . . . , Gn−1, Gn are arranged in row direction whereas a plurality of data lines D1, D2, . . . , Dn−1, Dn are arranged in column direction, intersecting the scanning lines. At the portion where each scanning line intersects each data line, first and second switches 71 and 73 transmitting a video signal are located at pixel regions placed on the left and right hands of the data line, respectively. The first and second pixel electrodes 71*c* and 73*c* are respectively connected to the first and second switches 71 and 73. Here, each of the first and second switches is preferably configured of an N-type or P-type thin film transistor.

The configuration of the liquid crystal display of the present invention is described below in more detail with reference to the portion “X” of FIG. 5A. The first switch 71 located at the left side of a data line D1 includes a first thin film transistor 71*a* whose source or drain is connected to the data line D1 and whose gate is connected to a corresponding scanning line G1, and a second-thin film transistor 71*b* whose gate is connected to the next scanning line G2, the second thin film transistor 71*b* being serially connected to the first thin film transistor 71*a*. The second thin film transistor 71*b* is connected to the first pixel electrode 71*c* so that a video signal is selectively delivered to the first pixel electrode according to N/OFF operation of the first and second thin film transistors 71*a* and 71*b*.

The second switch 73 located at the right side of the data line D1 includes a third thin film transistor 73*a* whose gate is connected to the corresponding scanning line G1 and whose source or drain is connected to the drain line D1, and a fourth thin film transistor 73*b* whose gate is connected to the corresponding scanning line G1, the fourth thin film transistor 73*b* being serially connected to the third thin film transistor 73*a*. Here, the second switch 73 may be configured of only the third thin film transistor 73*a*.

Figure 5B:
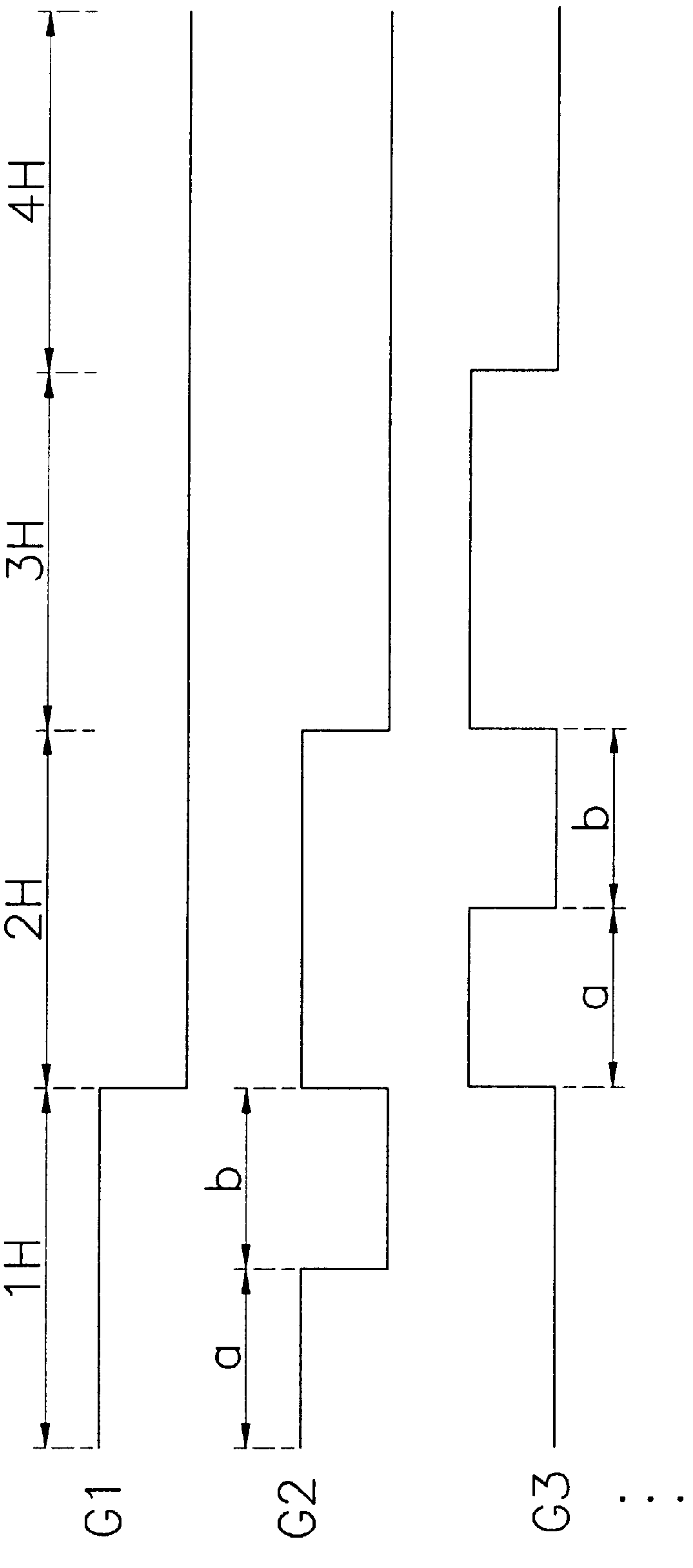
FIG. 5B shows the waveform of a driving signal applied to the scanning lines of the liquid crystal display of FIG. 5A.

In the liquid crystal display according to the first embodiment of the present invention, constructed as above, the procedure of transmitting a video signal to the first and second pixel electrodes is explained below with reference to the waveforms shown in FIG. 5B. FIG. 5B shows the waveform of a driving signal applied to the scanning lines of the liquid crystal display according to the first embodiment of the present invention.

Referring to FIG. 5B, with one horizontal period being divided into two sections (a) and (b), the video signal is applied to both of the pixels located at the left and right sides of the data line D1 during the first section (a), and it is applied to only the right pixel during the second section (b). That is, the first scanning line G1 receives a ‘high’ signal during the single horizontal period, and One second scanning line G2 receives the ‘high’ signal only during the first half horizontal period (it may not be exact ore half), i.e., section (a), and receives a ‘low’ signal during the second half horizontal period, i.e., second (b).

Accordingly, when both of the first scanning line G1 and second scanning line G2 are at the ‘high’ state, the first and second thin film transistors 71*a* and 71*b* of the first switch 71 and the third and fourth thin film transistors 73*a* and 73*b* of the second switch 73 are all turned on, to deliver the video signal to the first and second electrodes 71*c* and 73*c*. Thereafter, upon application of the ‘low’ signal to the second scanning line G2, the second thin film transistor 71*b* is turned off so that the video signal is not transmitted to the first pixel electrode 71*c*, being delivered to only the second pixel electrode 73*c*.

With one horizontal period being divided into two sections (a) and (b), as described above, the video signal loaded on one data line can be selectively delivered to the left and right pixel electrodes. Consequently, the driving signal applied to the scanning lines is controlled to allow one data line to send a video signal to its left and right pixels, thereby reducing the number of the data lines by half in comparison with the conventional liquid crystal display. This also decreases the number of the source drivers by half.

Figure 6A:
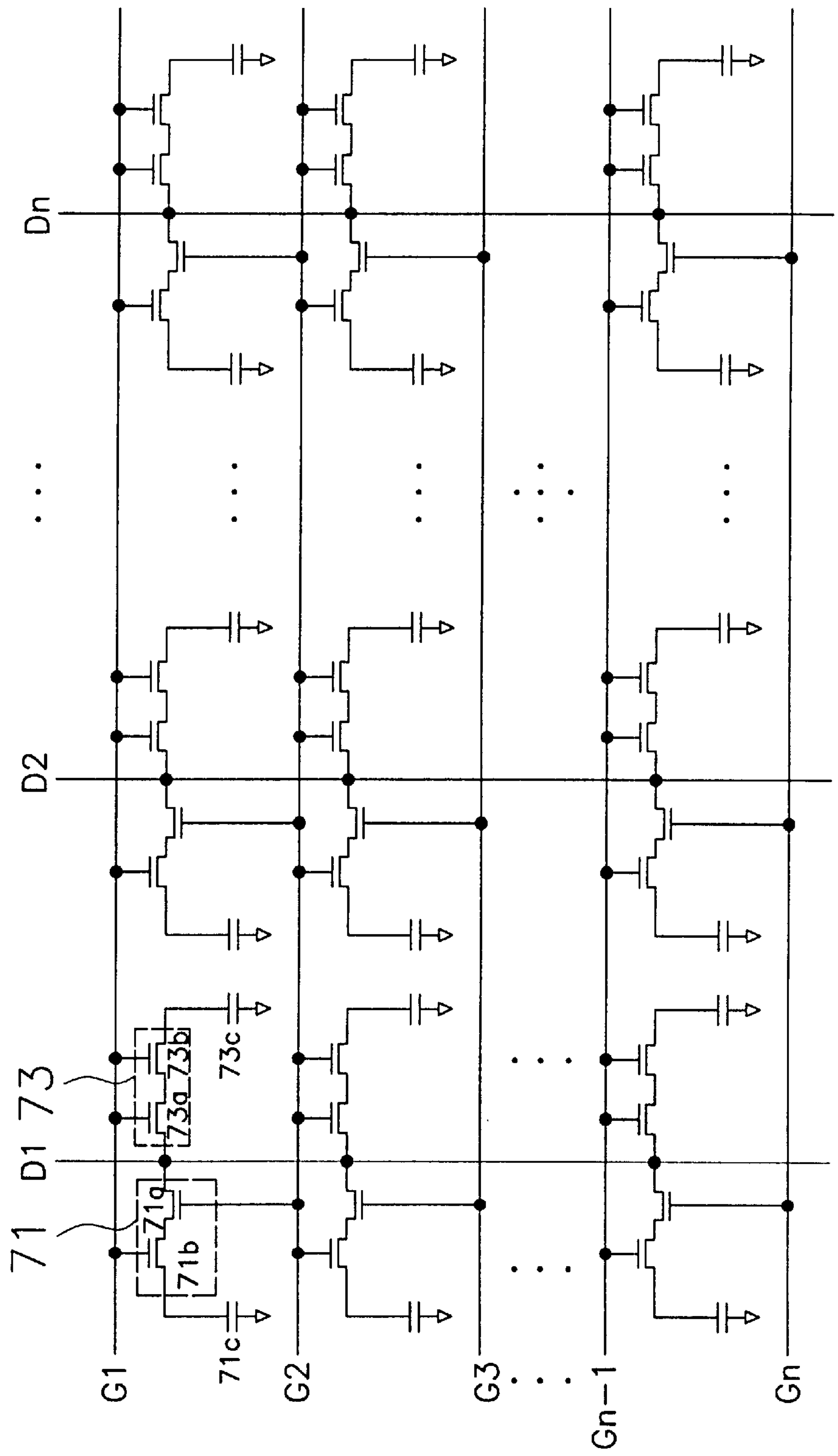
FIG. 6A shows the configuration of a liquid crystal display according to a second embodiment of the present invention.

FIG. 6A shows the configuration of a liquid crystal display according to a second embodiment of the present invention. Referring to FIG. 6A, the liquid crystal display of this embodiment has a difference from the first embodiment in the connection points of the gates of the first and second thin film transistors 71*a* and 71*b* constructing the first switch 71. Specifically, the first switch 71 includes the first thin film transistor 71*a* whose source or drain is connected to the data line D1 and whose gate is connected to the scanning line G2 next to the corresponding scanning line G1, and a second thin film transistor 71*b* whose gate is connected to the corresponding scanning line G1, the second thin film transistor being serially connected to the first thin film transistor 71*a*. The second switch 73 has the same configuration as that of the first switch 71.

Figure 6B:
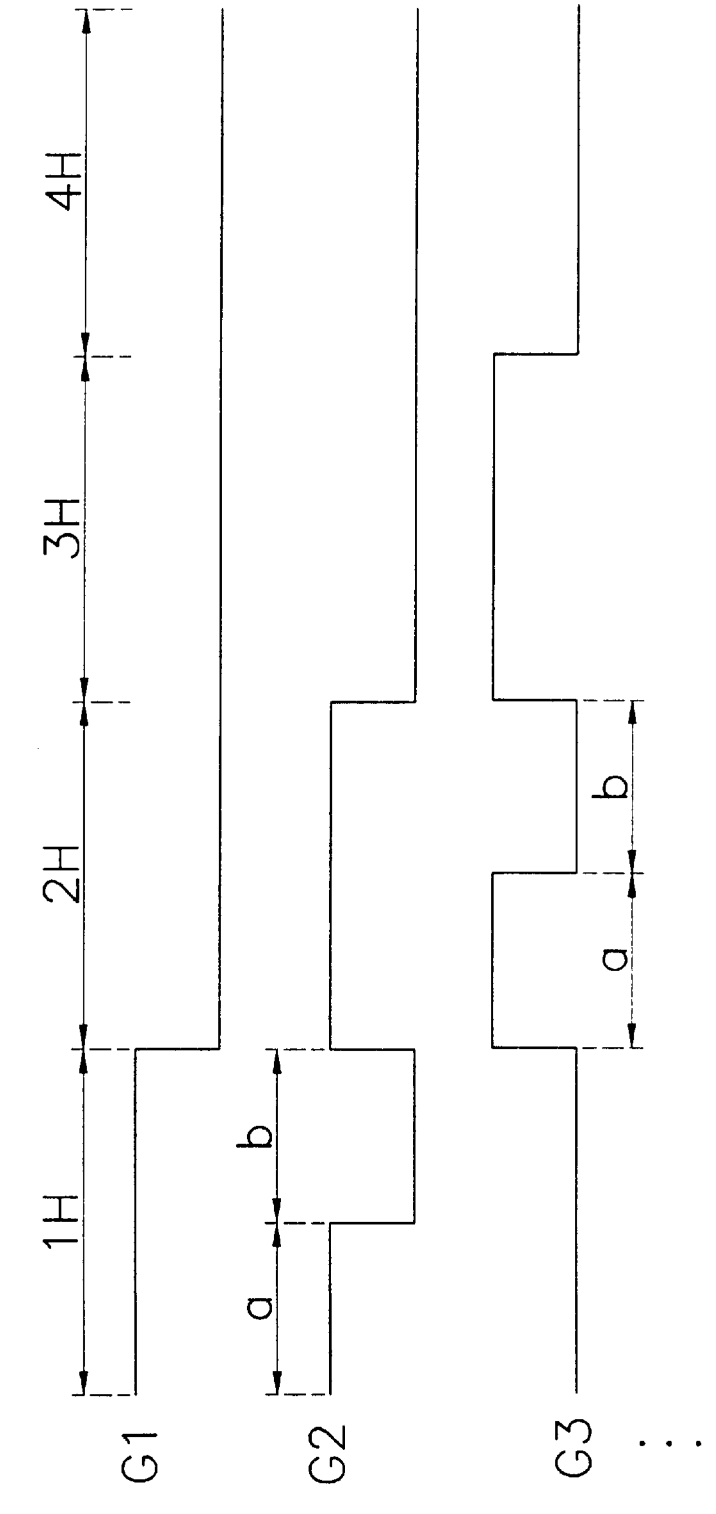
FIG. 6B shows the waveform of a driving signal applied to the scanning lines of the liquid crystal display of FIG. 6A.

In the liquid crystal display having the above-described configuration according to the second embodiment of the present invention, upon application of a driving signal with the waveform of FIG. 6B to the scanning lines, an image is displayed, moving from the upper part to the lower part of the liquid crystal panel, and a corresponding data line delivers the video signal to the pixels located at the left and right sides thereof, resulting in reduction in the total number of the data lines.

Figure 7A:
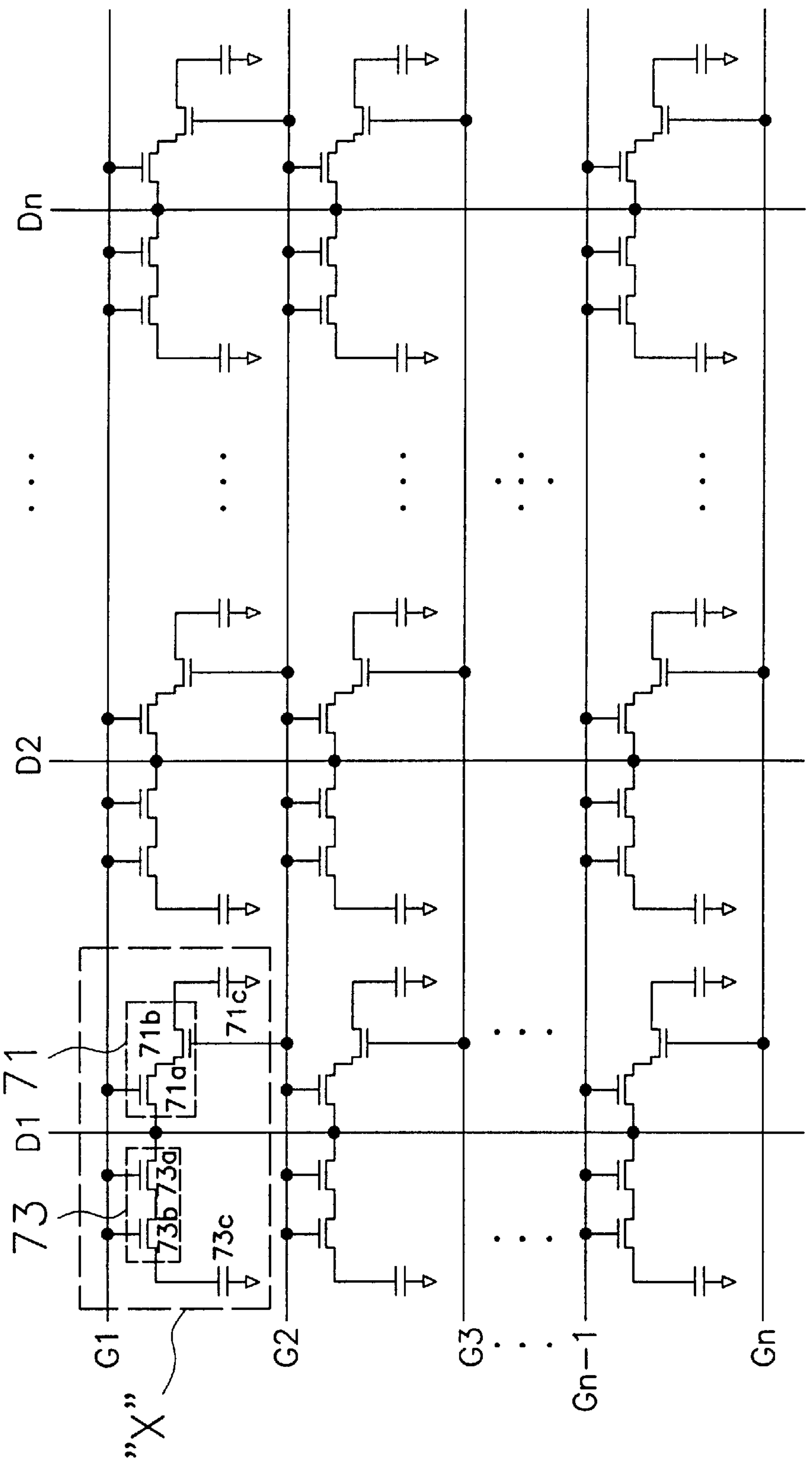
FIG. 7A shows the configuration of a liquid crystal display according to a third embodiment of the present invention.
Figure 7B:
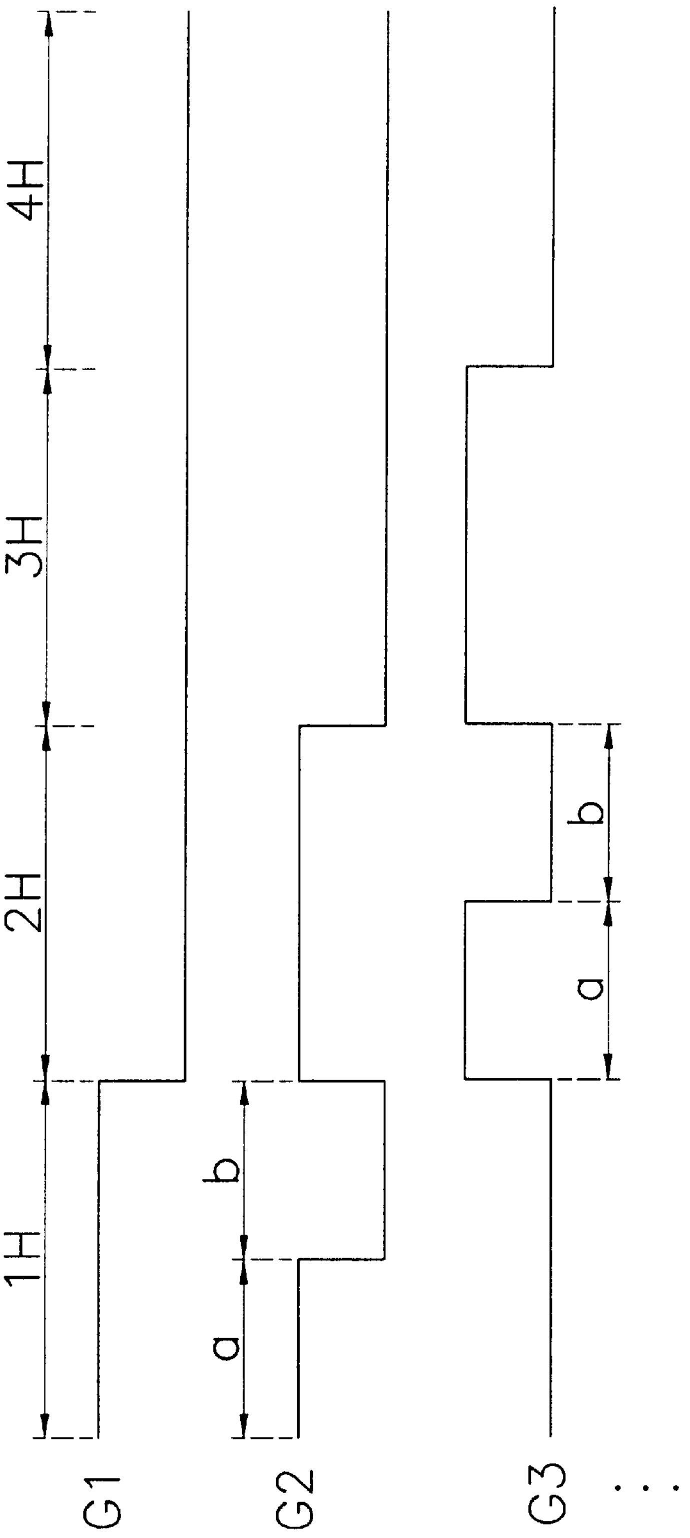
FIG. 7B shows the waveform of a driving signal applied to the scanning lines of the liquid crystal display of FIG. 7A.

FIG. 7A shows the configuration of a liquid crystal display according to a third embodiment of the present invention, and FIG. 7B shows the waveform of a driving signal applied to the scanning lines of the liquid crystal display of FIG. 7A. Referring to FIG. 7A, in this embodiment, the first switch 71 is placed at the right side of the data line D1 and the second switch 73 is located at its left side. That is, the first switch 71 is formed at the right side of the data line in the third embodiment whereas it is located at the left side of the data line in the first and second embodiments.

Specifically, the liquid crystal display according to the third embodiment of the present invention includes the plurality of scanning lines G1, G2, . . . , Gn−1, Gn arranged in row direction, the plurality of data lines D1, D2, . . . , Dn−1, Dn intersecting the scanning lines, the first switches 71 each of which is located at the right side of each data line intersecting each scanning line, the second switches 73 each of which is placed at the left side of each data line, the first pixel electrodes 71*c* each of which is connected to each first switch 71, and the second pixel electrodes 73*c* each of which is connected to each second switch 73.

The configuration of the liquid crystal display according to the third embodiment of the invention is explained below in detail with reference to the portion "X" of FIG. 7A. At the portion where the scanning line G1 and data line D1 intersect each other, the first switch 71 is disposed at the right side of the data line D1 and the second thin film transistor 71*b* constructing the first switch 71 is connected to the next scanning line G2. That is, the first switch 71 includes the first thin film transistor 71*a* whose source or drain is connected to the data line D1 and whose gate is connected to the corresponding scanning line G1, and the second thin film transistor 71*b* whose gate is connected to the next scanning line G2, the second thin film transistor being serially connected to the first thin film transistor 71*a*.

The second switch 73 is located at the left side of the data line D1 and has two thin film transistors. Specifically, the second switch 73 includes the third thin film transistor 73*a* whose source or data is connected to the data line D1 and whose gate is connected to the corresponding scanning line G1, and the fourth thin film transistor 73*b* whose gate is connected to the corresponding scanning line G1, the fourth thin film transistor being serially connected to the third thin film transistor 73*a*. Here, the second switch 73 may be configured of a single thin film transistor.

The liquid crystal display of the third embodiment of the invention, constructed as above, is driven by a driving signal having the waveform of FIG. 7B. Referring to FIG. 7B, during one horizontal period, the first scanning line G1 receives a 'high' signal while the second scanning line G2 receives the 'high' signal during the section (a) corresponding to the first half of the horizontal period but receives a 'low' signal during the sect-or (b), i.e., the second half of the horizontal period. When the 'high' signal is applied to both of the first and second scanning lines G1 and G2, the thin film transistors constructing the first and second switches 71 and 83 are all turned on, to deliver a video signal to the first and second pixel electrodes 71*c* and 73*c*. When the 'high' signal is applied to the first scanning line G1 and the 'low' signal is applied to the second scanning line G2, the second thin film transistor of the first switch 71 is turned off so that the video signal is not delivered to the first pixel electrode 71*c*, being sent to only the first pixel electrode 71*c*. In this manner, a corresponding image is display, moving from the upper portion to the lower portion of the liquid crystal panel.

Figure 8A:
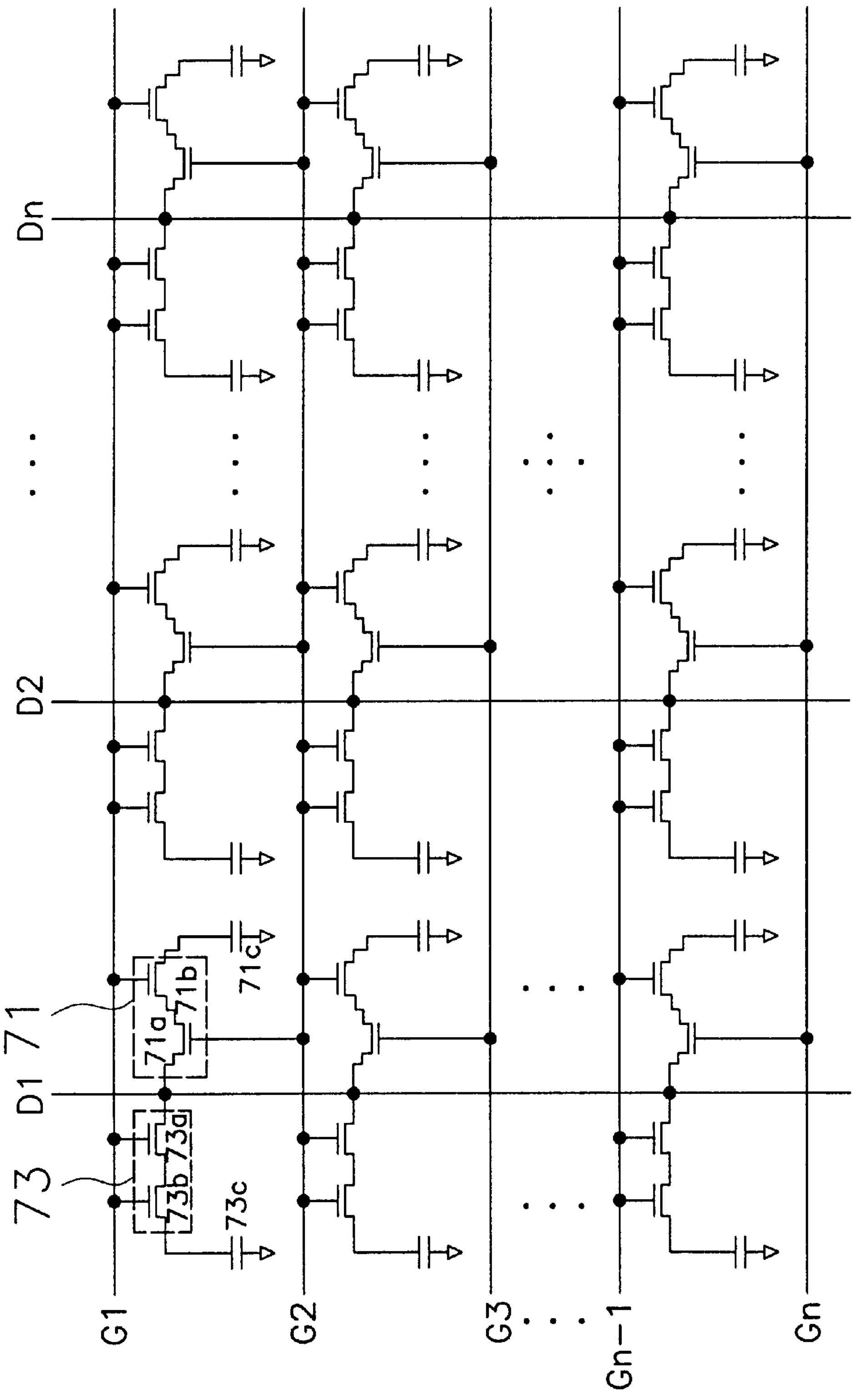
FIG. 8A shows the configuration of a liquid crystal display according to a fourth embodiment of the present invention.
Figure 8B:
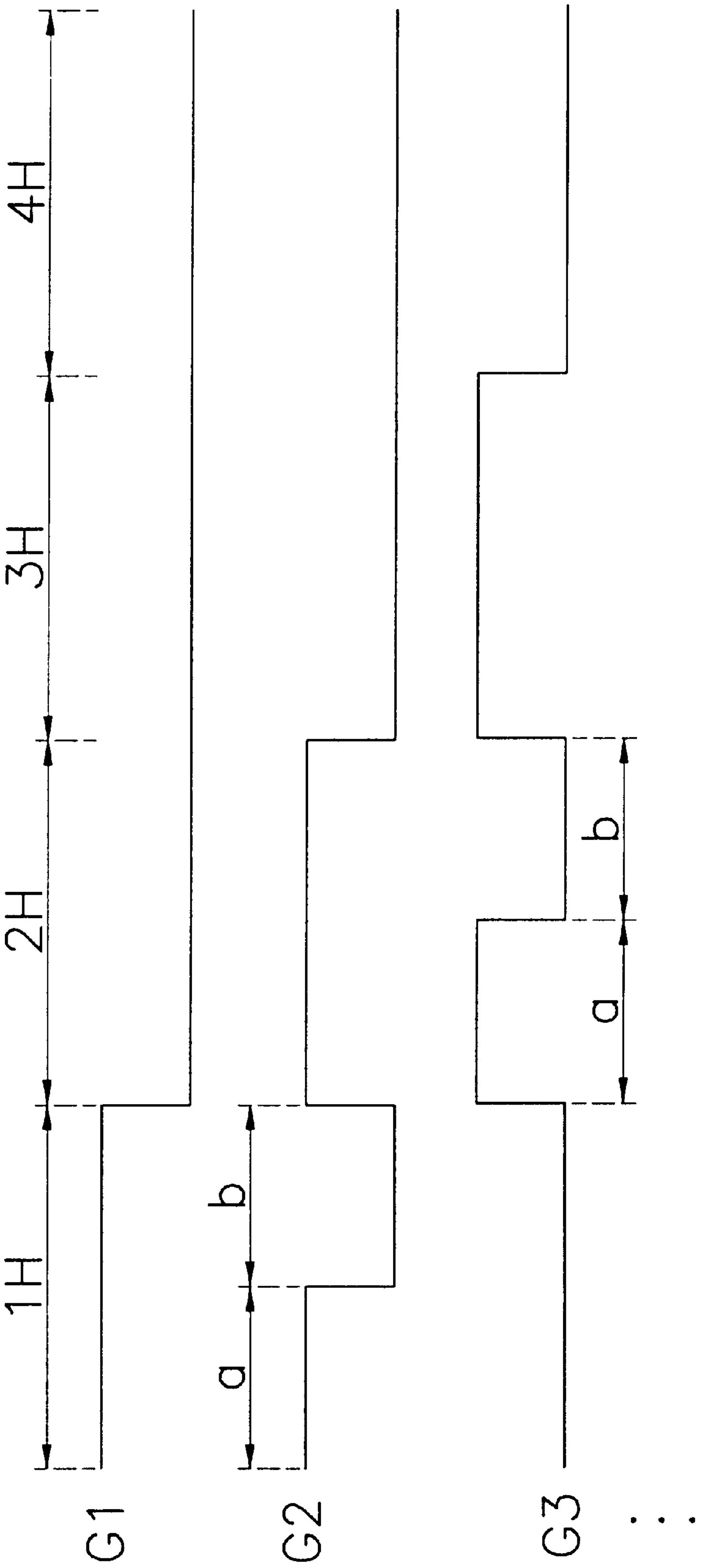
FIG. 8B shows the waveform of a driving signal applied to the scanning lines of the liquid crystal display of FIG. 8A.

FIG. 8A shows the configuration of a liquid crystal display according to a fourth embodiment of the present invention, and FIG. 8B shows the waveform of a driving signal applied to the scanning lines of the liquid crystal display of FIG. 8A. Referring to FIG. 8A, he liquid crystal display according to the fourth embodiment of the present invention has a difference from the third embodiment in the connection points of the gates of the first and second thin film transistors 71*a* and 71*b* constructing the first switch 71. That is, the gate of the first thin film transistor 71*a* of the first switch 71 is connected to the scanning line G2 next to the corresponding scanning line G1 in the fourth embodiment, while the gale of- able second thin film transistor 71*b* of the first switch 71 is connected to the scanning line G2 in the third embodiment.

Specifically, the first switch 71 according to the fourth embodiment of the present invention includes the first thin film transistor 71*a* whose source or drain is connected to the data line D1 and whose gate is connected to the next scanning line G2, and the second thin film transistor 71*b* whose gate is connected to the corresponding scanning line G1, the second thin film transistor 71*b* being serially connected to the first thin film transistor 71*a*. Accordingly, upon application of a driving signal having the waveform of FIG. 8B to the scanning lines, a corresponding video signal can be selectively supplied to the pixels respectively placed at the left and right sides of the data line D1. The image corresponding to the video signal is displayed, moving from the upper portion to the lower portion of the liquid crystal panel.

Figure 9A:
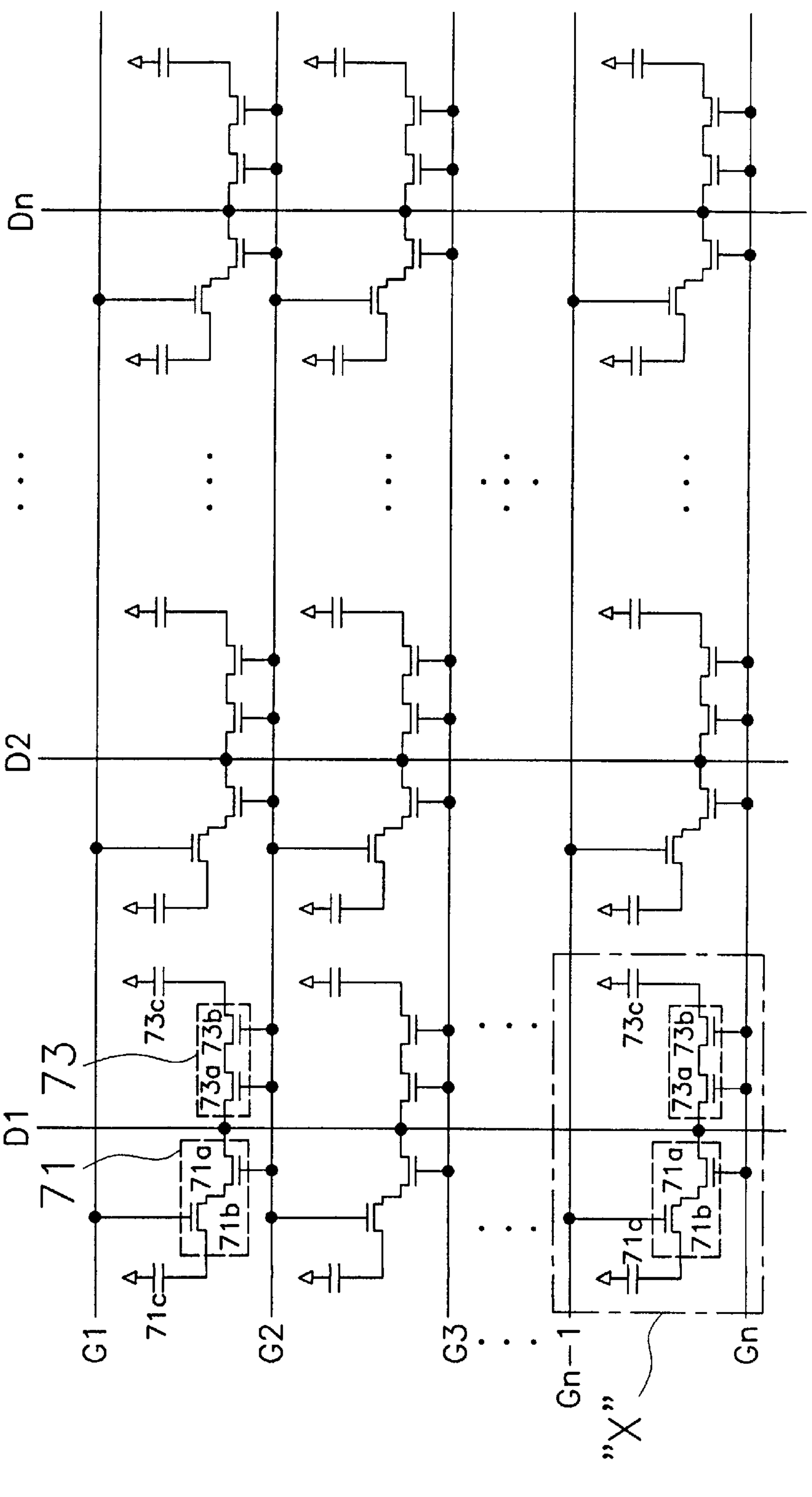
FIG. 9A shows the configuration of a liquid crystal display according to a fifth embodiment of the present invention.
Figure 9B:
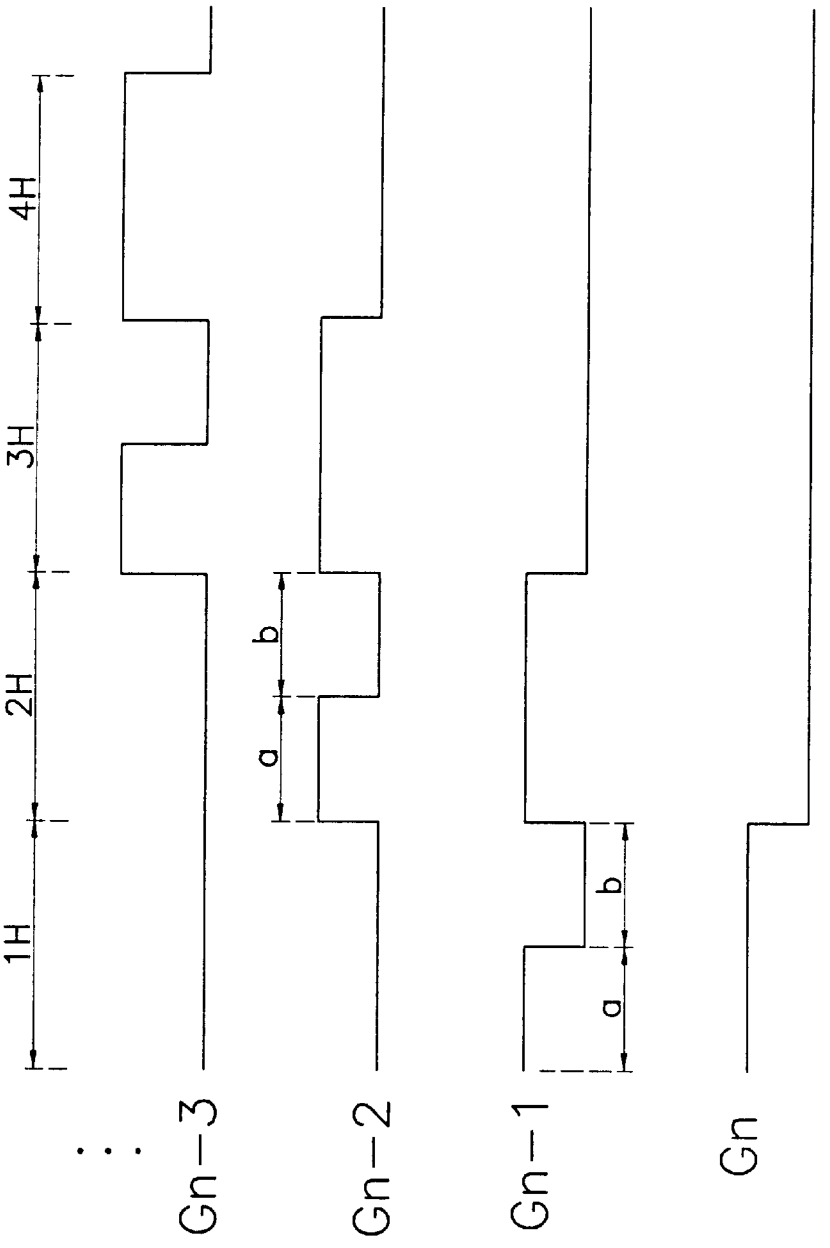
FIG. 9B shows the waveform of a driving signal applied to the scanning lines of the liquid crystal display of FIG. 9A.

FIG. 9A shows the configuration of a liquid crystal display according to a fifth embodiment of the present invention, and FIG. 9B shows the waveform of a driving signal applied to the scanning lines of the liquid crystal display of FIG. 9A. The fifth embodiment has a difference frothier first to fourth embodiments in the location where the thin film transistors constructing the first and second switches are formed.

In the first to fourth embodiments of the present invention, he thin film transistors and pixel electrodes are located at portions where the data lines D1, D2, . . . , Dn−1, Dn intersect the scanning lines G1, G2, . . . , Gn−1, Gn, sequentially, starting from the first intersecting portion where the first scanning line intersects the data lines to the (n−1) th intersecting portion where the (n−1) th scanning line intersects the data lines. The thin film transistors and the pixel electrodes are not formed at the portion where the nth scanning line intersects the data lines.

In the fifth embodiment of the invention, on the other hand, the thin film transistors and the pixel electrodes are not placed at the portion where the first scanning line intersects the data lines, but located at the portions, sequentially starting from the second intersecting portion where the second scanning line intersect the data lines to the nth intersecting portion where the nth scanning line intersects the data line.

In addition, one of the four thin film transistors, formed at the portion where (n−1)th scanning line intersects the data lines, is connected to the (n−1)th scanning line in the fifth embodiment, while it is connected to the nth scanning line in the first to fourth embodiments. When a driving signal having the waveform of FIG. 9B is applied to the scanning lines of the liquid crystal display of the fifth embodiment, a corresponding image is displayed, moving from the lower portion to the upper portion of the liquid crystal panel. The scanning lines are provided with the driving signal, in one horizontal period being split into two sections (a) and (b), as shown in FIG. 9B, so that the video signal can be selectively applied to the pixels respectively located at the left and right sides of each data line.

There is described below the fifth embodiment of the present invention in detail. Referring to FIG. 9A, the plurality of scanning lines G1, G2, . . . , Gn−1, Gn are arranged in one direction, and the plurality of data lines D1, D2. . . . , Dn−1, Dn intersect the scanning lines. The first and second switches 71 and 73 are formed at the left and right sides of each data line, respectively. Each of the first and second switches 71 and 73 consists of thin film transistors, each thin film transistor being an N-type or P-type thin film transistor. The gate of the second thin film transistor 71*b* of the first switch 71 located at the left of the data line D1 is connected to the (n−1) th scanning line, and the gate of its first thin film transistor 71*a* is connected to the nth scanning line. The second switch 73 formed at the right side of each data line includes the third and fourth thin film transistors both of which are connected to the nth scanning line. Here, the second switch 73 can be configured of a single thin film transistor.

There is explained below in more detail the operation of the liquid crystal display according to the fifth embodiment of the present invention with reference to the portion "X" of FIG. 9A. As shown in FIG. 9B, the scanning line Gn receives a 'high' signal during one horizontal period, and the previous scanning line Gn−1receives the 'high' signal during only the first half section (a) thereof. During the period where both of the corresponding scanning line Gn and previous scanning line Gn−1 are in the 'high state', the thin film transistors constructing the first and second switches 7 and 73 are all turned on, to deliver a corresponding video signal to the first and second pixel electrodes 71*c* and 73*c*.

When a 'low' signal is applied to the previous scanning line Gn−1 during the second half section (b) of the horizontal period, the second thin film transistor of the first switch 71 is turned off, to transmit no video signal to the first pixel electrode 71*c*. At this time, the switch 73 located at the right side of the data line is held in turn-on state, to deliver the video signal to the second pixel electrode 73*c*. As described above, the video signal can be selectively transmitted to the pixels respectively formed at the left and right sides of each data line, resulting in reduction in the total number of the data lines by half.

Figure 10A:
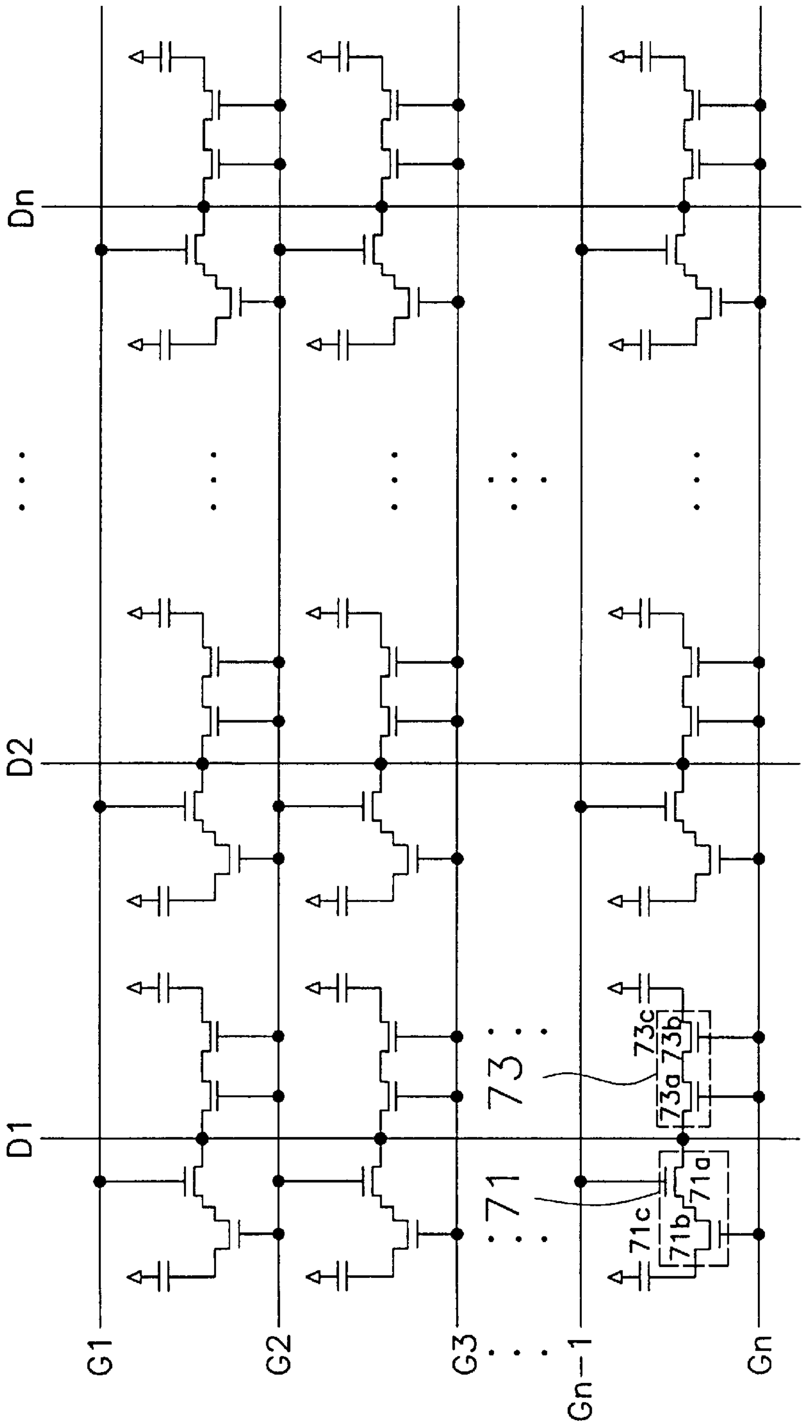
FIG. 10A shows the configuration of a liquid crystal display according to a sixth embodiment of the present invention.
Figure 10B:
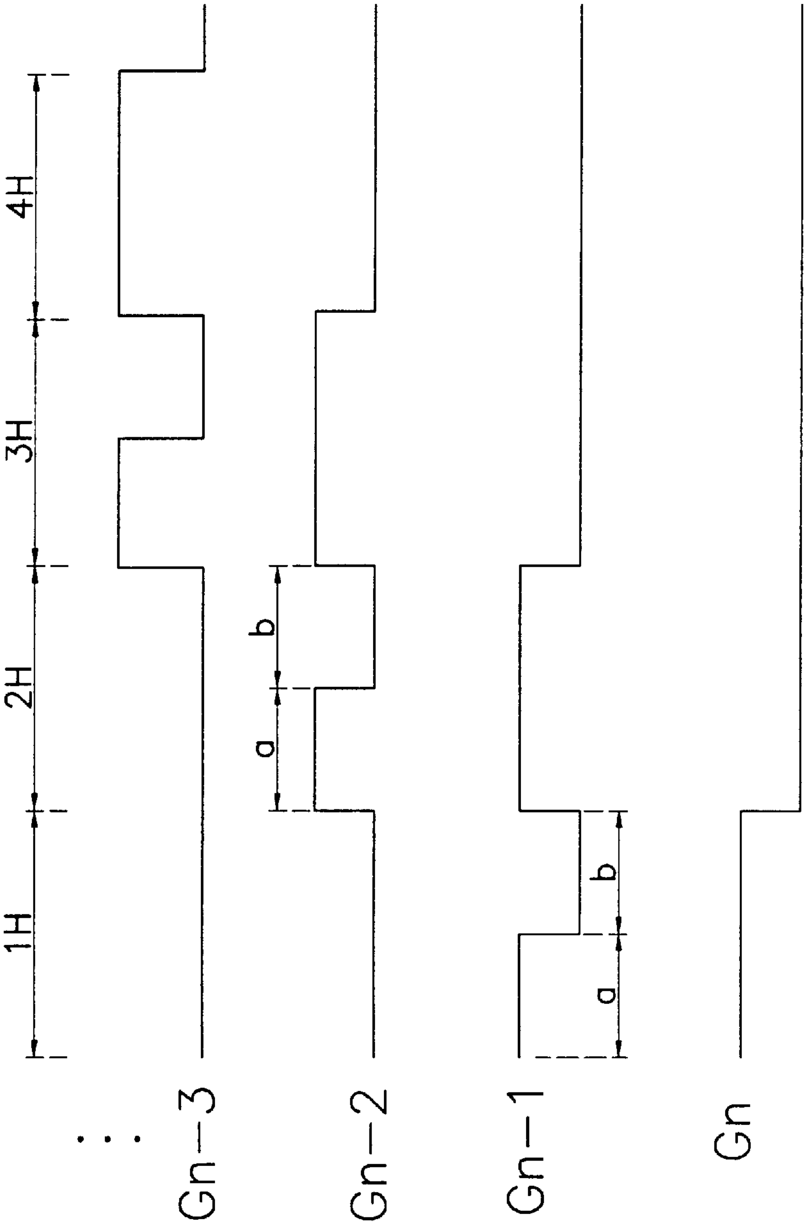
FIG. 10B shows the waveform of a driving signal applied to the scanning lines of the liquid crystal display of FIG. 10A.

FIG. 10A shows the configuration of a liquid crystal display according to a sixth embodiment of the present invention, and FIG. 10B shows the waveform of a driving signal applied to the scanning lines of the liquid crystal-display of FIG. 10A. The sixth embodiment of the present invention has a difference from the fifth embodiment in the connection points of the gates of the first and second thin film transistors 71*a* and 71*b* constructing the first switch 71. That is, the gate of the first thin film transistor 71*a* is connected to the (n−1)th scanning line Gn−1 and that of the second thin film transistor 71*b* is connected to the nth scanning line Gn in the sixth embodiment: whereas the gate of the first thin film transistor 71*a* is connected to the nth scanning line Gn and that of the second thin film transistor 71*b* is connected to the (n−1) th scanning line in the fifth embodiment. Here, the second switch 73 has the same configuration as that of the fifth embodiment.

Upon application of the driving signal shown in FIG. 10B to the scanning lines, a video signal from a corresponding data line can be selectively delivered to the pixels located at the left and right of t data line. Further, a corresponding image is displayed, moving from the lower portion to the upper portion of the liquid crystal panel as in the fifth embodiment.

Figure 11A:
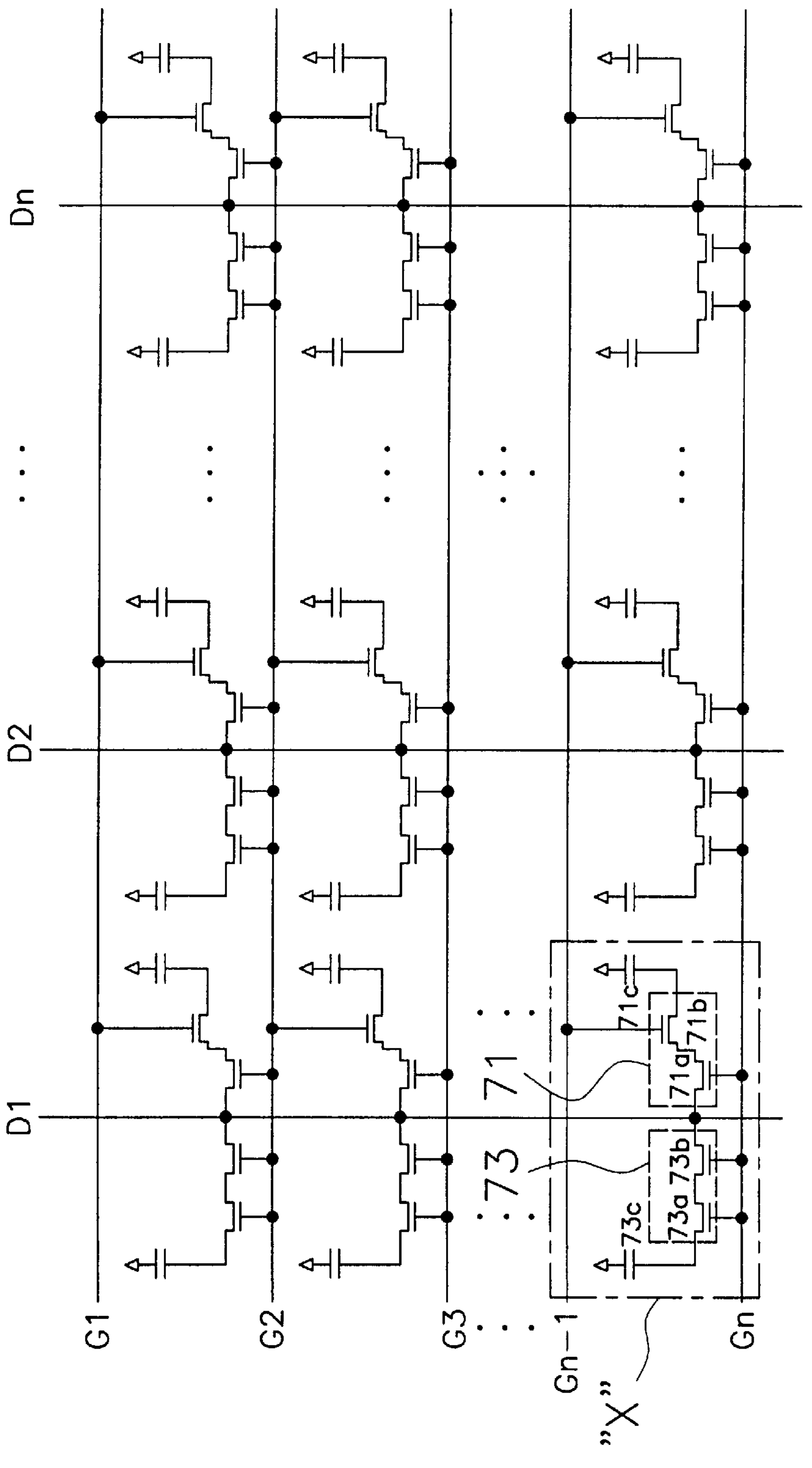
FIG. 11A shows the configuration of a liquid crystal display according to a seventh embodiment of the present invention.
Figure 11B:
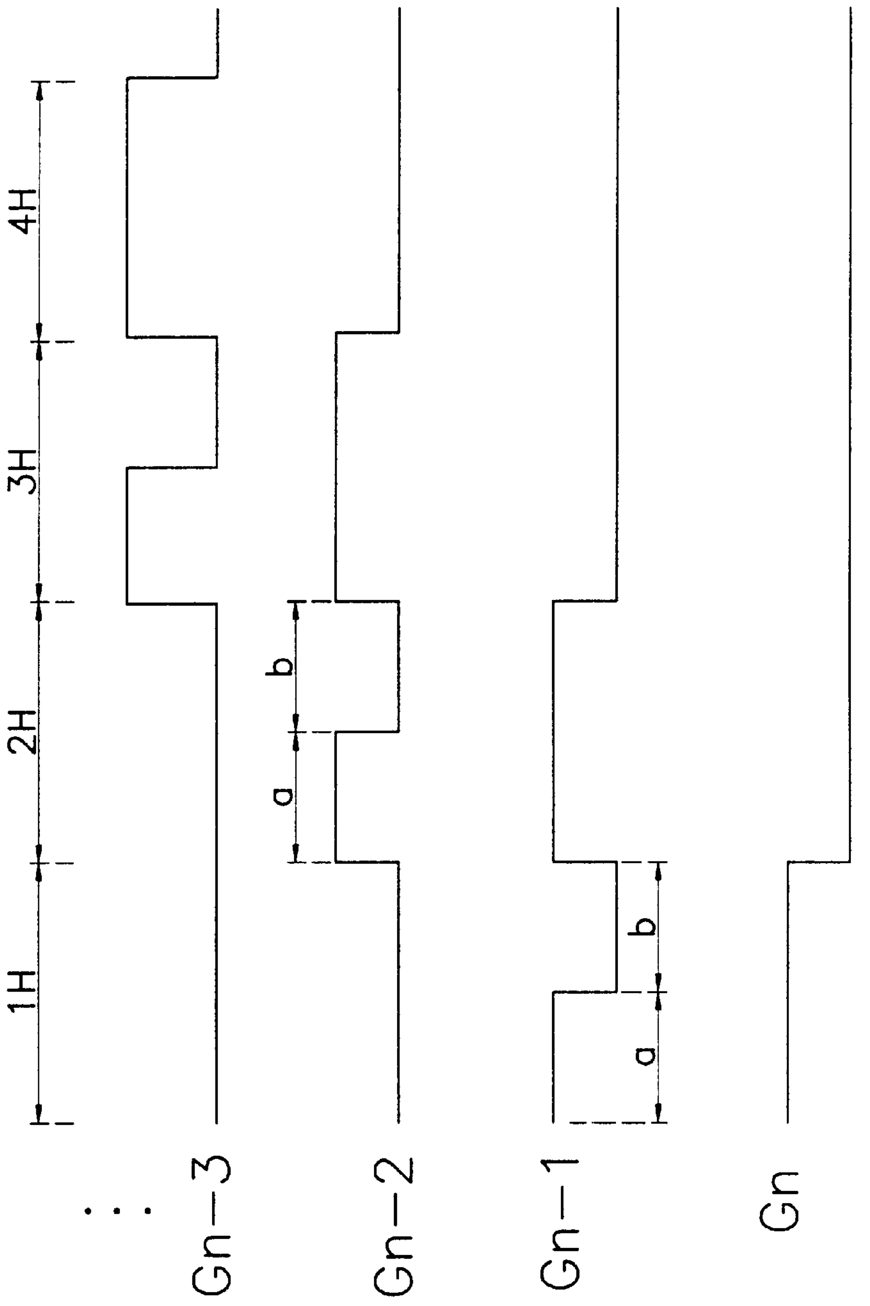
FIG. 11B shows the waveform of a driving signal applied to the scanning lines of the liquid crystal display of FIG. 11A.

FIG. 11A shows the configuration of a liquid crystal display according to a seventh embodiment of the present invention, and FIG. 11B shows the waveform of a driving signal applied to the scanning lines of the liquid crystal display of FIG. 11A. The liquid crystal display according to the seventh embodiment of the invention is constructed in such a manner that, as shown in FIG. 11A, the first and second switches are located at the right and left sides of each data line, respectively. That is, the liquid crystal display of the seventh embodiment includes the plurality of scanning lines G1, G2, . . . , Gn−1, Gn arranged in one direction, the plurality of data lines D1, D2, . . . , Dn−1, Dn intersecting the scanning lines, the first and second switches 71 and 73 formed at both sides of each data line and controlled by a corresponding scanning line and the scanning line previous thereto, and the first and second pixel electrodes 73*a* and 73*c* respectively connected to the first and second switches 71 and 73.

This is described below in more detail with reference to the portion "X" of FIG. 11A. The first switch 71 includes the first thin film transistor 71*a* whose source or drain is connected to the data line D1 and whose gate is connected to the corresponding scanning line Gn, and the second thin film transistor 71*b* whose gate is connected to the previous scanning line Gn−1, the second thin film transistor being serially connected to the first thin film transistor. The second switches 73 includes the third thin film transistor 73*a* whose source or drain is connected to the data line D1 and whose gate is connected to the corresponding scanning line Gn, and the fourth thin film transistor 73*b* whose gate is connected to the corresponding scanning line Gn, the fourth thin film transistor 73*b* being serially connected to the third thin film transistor 73*a*. The second switch 73 can be configured of only the third thin film transistor 73*a*. When a driving signal with the waveform of FIG. 11B is applied to the scanning lines of the liquid crystal display constructed as above, a corresponding image is displayed, moving from the lower portion to the upper portion of the liquid crystal panel. This is the same operation as that of the fifth and sixth embodiments.

Figure 12A:
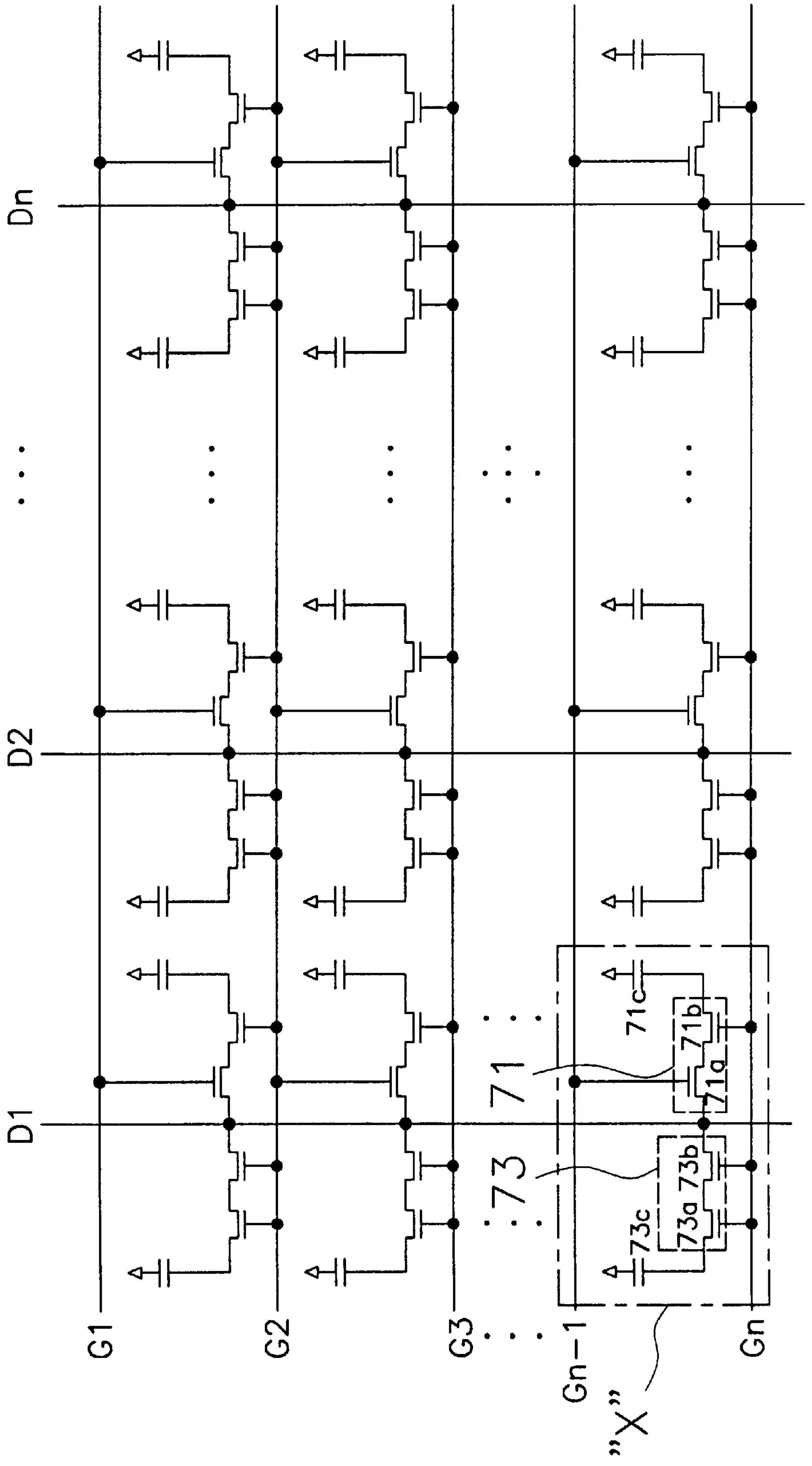
FIG. 12A shows the configuration of a liquid crystal display according to an eighth embodiment of the present invention.
Figure 12B:
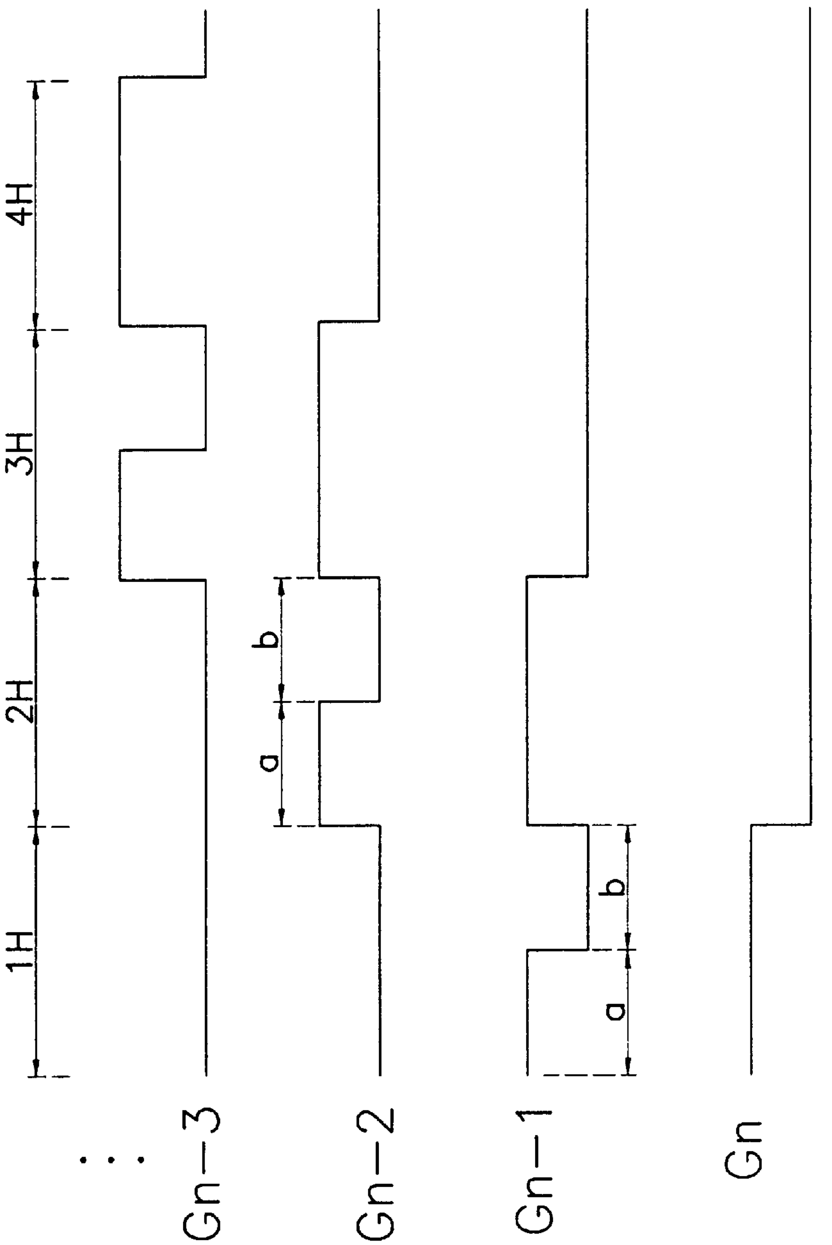
FIG. 12B shows the waveform of a driving signal applied to the scanning lines of the liquid crystal display of FIG. 12A.

FIG. 12A shows the configuration of a liquid crystal display according to an eighth embodiment of the present invention, and FIG. 12B shows the waveform of a driving signal applied to the scanning lines of the liquid crystal display of FIG. 12A. The eighth embodiment of the present invention has a difference from he seventh embodiment in the connection points of the gates of the first and second thin film transistors 71*a* and 71*b* constructing the first switch 71. That is, the first switch 71 according to the eighth embodiment of the invention includes the first thin film transistor 71 whose source or drain is connected to the data line D1 and whose gate is connected to the scanning line Gn−1 previous to the corresponding scanning line Gn, and a second thin film transistor 71*b* whose gate is connected to the corresponding scanning line Gn, the second thin film transistor 71*b* being connected to the first thin film transistor 71*a*. Here, the second switch 73 has the same configuration as that of the second switch 73 according to the seventh embodiment.

When a driving signal with the waveform of FIG. 12B is applied to the scanning lines of the liquid crystal display according to the eighth embodiment, constructed as above, an image is displayed, moving from the lower portion to the upper portion of the liquid crystal panel. As described above, the liquid crystal display of the present invention can deliver a video signal to the pixels located at the left and right sides of each data line, resulting in reduction n the total number of the data lines by half.

The liquid crystal display of the present invention which transmits two video signals to two pixels, respectively, during one horizontal period by the gate driver and source driver constructed desirably for the LCD of this invention can reduce the total number of the data lines, resulting in decrease in the number of the source drivers. However, the line time during which a video signal is delivered to each pixel is reduced because the video signal is needed to be sent to two pixels during one horizontal period. This requires the analog circuit to have the operation speed twice that of the conventional circuit. This problem remarkably appears in dot inversion. Accordingly, the video signal is written into the pixel electrodes in such a manner shown in FIG. 13.

Figure 13:
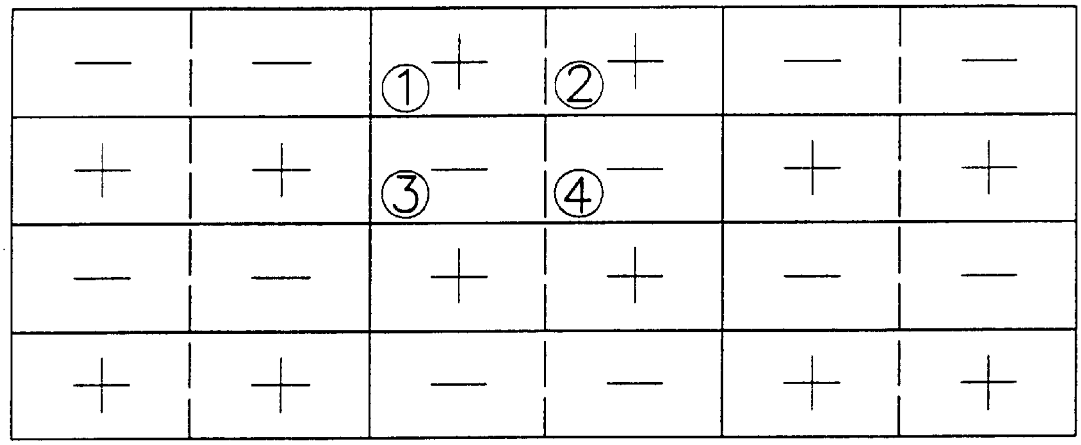
FIG. 13 shows a video signal writing order and the polarities of video signals according to the liquid crystal display of the present invention.

The video signals are written in the order indicated by numbers shown in FIG. 13. ② is precharged at the moment when ① is written because both of ① and ② are positive signals. Thus, charging can be carried out during only one-half of one horizontal period. ③ and ① require longer time for charging and discharging since their polarities are opposite to those of ① and ②. Accordingly, during the blanking time between writing of ① and ② and writing of ③ and ① the charging and discharging time is reduced by data line precharge or charge sharing between the data lines. There is no writing time problem with ④ because it is precharged during ③ is written. However, there may be a problem in writing of ③. To solve this, the magnitudes of the 'high' and 'low' sections (a) and (b) of the driving signal applied to the scanning lines during one horizontal period are controlled to secure the time required for writing ③.

The liquid crystal display and driving circuit thereof according to the present invention has the following advantages. First of all, one data line can selectively deliver a video signal to two pixels located at the left and right sides thereof, resulting in reduction in the number of the data lines by half. This also decreases the number of the source drivers by half. Accordingly, it is possible to reduce the size of the display and the cost for manufacturing it. Moreover, more images can be displayed in the same size than in the conventional display, realizing a high resolution.

It will be apparent to those skilled in the art that various modifications and variations can be made in the liquid crystal display and circuit for driving the same of the present invention without departing from the spirit or scope of the invention. Thus, it is intended that the present invention covers the modifications d variations of this invention provided they come within the scope the appended claims and their equivalents.

What is claimed is:

1. A liquid crystal display having first and second plates and a liquid crystal being sealed therebetween, the liquid crystal display comprising:

a plurality of scanning lines arranged on the first plate in one direction;

a plurality of data lines arranged on the first plate, intersecting the scanning lines;

a first switch formed at one side of each data line in the portion where each scanning line intersects each data line, the first switch being controlled by a corresponding scanning line and the next scanning line;

a second switch formed at the other side of each data line in the portion where each scanning line intersects each data line, the second switch being controlled by the corresponding scanning line;

first and second pixel regions for selectively displaying a video signal under the control of the first and second switches.

2. The liquid crystal display as claimed in claim 1, wherein each of the first and second switches includes a thin film transistor.

3. The liquid crystal display as claimed in claim 2, wherein the thin film transistor is an N-type or P-type thin film transistor.

4. The liquid crystal display as claimed in claim 2, wherein the first switch is configured of at least two thin film transistors, and the second switch is configured of at least one thin film transistor.

5. The liquid crystal display as claimed in claim 1, wherein the first switch is placed at the left side of each data line and the second switch is located at its right side.

6. The liquid crystal display as claimed in claim 1, wherein the first switch is placed at the right side of each data line and the second switch is located at its left side.

7. The liquid crystal display as claimed in claim 5, wherein the first switch includes a first thin film transistor whose source or drain is connected to a corresponding data line and whose gate is connected to a corresponding scanning line, and a second thin film transistor whose gate is connected to the next scanning line, the second thin film transistor transmitting a video signal delivered through the first thin film transistor to the first pixel region.

8. The liquid crystal display as claimed in claim 5, wherein the first switch includes a first thin film transistor whose source or drain is connected to the data line and whose gate is connected to the next scanning line, and a second thin film transistor whose gate is connected to the corresponding scanning line, the second thin film transistor transmitting the video signal delivered through the first thin film transistor to the first pixel region.

9. The liquid crystal display as claimed in claim 5, wherein the second switch includes a third thin film transistor whose source or drain is connected to the data line and whose gate is connected to the corresponding scanning line, and a fourth thin film transistor whose gate is connected to the corresponding scanning line, the fourth thin film transistor transmitting the video signal delivered through the third thin film transistor to the second pixel region.

10. The liquid crystal display as claimed in claim 5, wherein the second switch includes a third thin film transistor whose source and drain is connected to the data line and whose gate is connected to the corresponding scanning line.

11. The liquid crystal display as claimed in claim 6, wherein the first switch includes a first thin film transistor whose source or drain is connected to the data line and whose gate is connected to the next scanning line, and a second thin film transistor whose gate is connected to the corresponding scanning line, the second thin film transistor being serially connected to the first thin film transistor.

12. The liquid crystal display as claimed in claim 6, wherein the first switch includes a first thin film transistor whose source or drain is connected to the data line and whose gate is connected to the corresponding scanning line, and-a second thin film transistor whose gate is connected to the next scanning line, the second thin film transistor being serially connected to the first thin film transistor.

13. The liquid crystal display as claimed in claim 6, wherein the second switch includes a third thin film transistor whose source or drain is connected to the data line and whose gate is connected to the corresponding scanning line, and a fourth thin film transistor whose gate is connected to the corresponding scanning line, the fourth thin film transistor being serially connected to the third thin film transistor.

14. The liquid crystal display as claimed in claim 6, wherein the second switch includes a third thin film transistor whose source and drain is connected to the data line and whose gate is connected to the corresponding scanning line.

15. The liquid crystal display as claimed in claim 5, wherein the first switch includes a first thin film transistor whose source or drain is connected to the data line and whose gate is connected to the next scanning line, and a second thin film transistor whose gate is connected to the corresponding scanning line, the second thin film transistor being serially connected to the first thin film transistor.

16. The liquid crystal display as claimed in claim 5, wherein the first switch includes a first thin film transistor whose source or drain is connected to the data line and whose gate is connected to- the corresponding scanning line, and a second thin film transistor whose gate is connected to the next scanning line, the second thin film transistor being serially connected to the first thin film transistor.

17. The liquid crystal display as claimed in claim 5, wherein the second switch includes a third thin film transistor whose source or drain is connected to the data line and whose gate is connected to the next scanning line, and a fourth thin film transistor whose gate is connected to the next scanning line, the fourth thin film transistor being serially connected to the third thin film transistor.

18. The liquid crystal display as claimed in claim 5, wherein the second switch includes a third thin film transistor whose source and drain is connected to the data line and whose gate is connected to the next scanning line.

19. The liquid crystal display as claimed in claim 6, wherein the first switch includes a first thin film transistor whose source or drain is connected to the data line and whose gate is connected to the next scanning line, and a second thin film transistor whose gate is connected to the corresponding scanning line, the second thin film transistor being serially connected to the first thin film transistor.

20. The liquid crystal display as claimed in claim 6, wherein the first switch includes a first thin film transistor whose source or drain is connected to the data line and whose gate is connected to the corresponding scanning line, and a second thin film transistor whose gate is connected to the next scanning line, the second thin film transistor being serially connected to the first thin film transistor.

21. The liquid crystal display as claimed in claim 6, wherein the second switch includes a third thin film transistor whose source or drain is connected to the data line and whose gate is connected to the next scanning line, and a fourth thin film transistor whose gate is connected to the next scanning line, the fourth thin film transistor being serially connected to the third thin film transistor.

22. The liquid crystal, display as claimed in claim 6, wherein the second switch includes a third thin film transistor whose source and drain is connected to the data line and whose gate is connected to the next scanning line.

* * * * *